May 2, 1950     P. SBERNADORI     2,506,176
SLIDE RULE
Filed Feb. 12, 1948
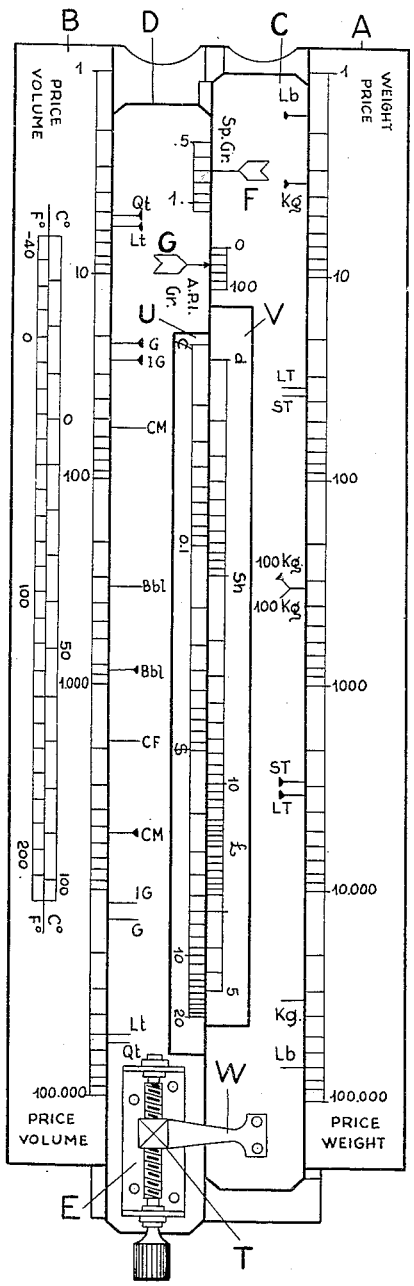
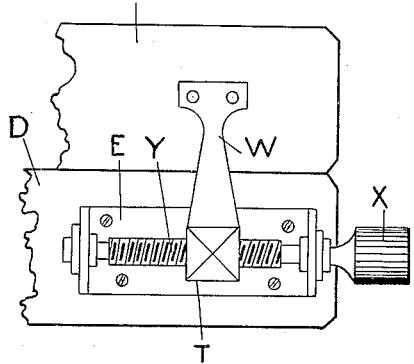
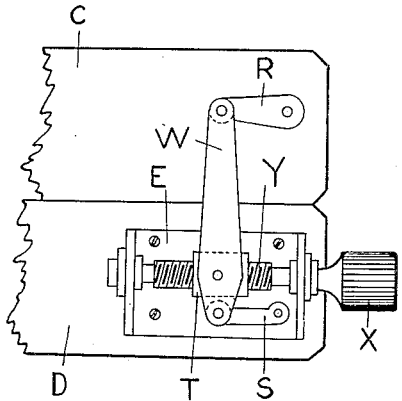
Inventor
Paolo Sbernadori
By Robert E. Burns
Attorney Patented May 2, 1950

2,506,176

UNITED STATES PATENT OFFICE 2,506,176

SLIDE RULE

Paolo Sbernadori, Rome, Italy

Application February 12, 1948, Serial No. 7,894
In Italy April 4, 1947

4 Claims. (Cl. 235—70)

1

This invention has for its object to provide a time-saving device intended to be used by the personnel of the industrial organizations dealing with the trade of liquid, semi-liquid and semi-solid products, where a wide range of specific gravities is involved, or where for each one of such products, as it is the case of petroleum products, the specific gravity, or the A. P. I. gravity, is subject to sensible variations under the influence of the temperature.

It is well known that in the market of liquid, semi-liquid and semi-solid products in general, and in particular in that of petroleum products, the operator is continually obliged to repeat various arithmetical conversions from one unit system of measure to another with respect to quantities, prices, quotations, expenses, charges, freights, taxes, duties, profits and losses applicable to the products themselves, which generally have different specific gravity. Said quantities and prices are expressed in various units of weight or volume, and in money of various countries.

Such computation is in part aided by appropriate tables, charts and handbooks which furnish the basic data, and may be made quicker by use of ordinary slide-rulers. However, these latter are not widely adopted because, apart from the fact that they do not avoid the consultation of tables and charts, they only save a limited amount of time, as such calculation must be repeated for each single conversion required.

A further object of the present invention is to provide an instrument very easy to operate by which, given an initial quantity or a value of goods, expressed in a certain unit of measure (weight or volume), it is immediately possible, by means of one simple setting of the instrument, to read instantly and simultaneously the equivalent quantities expressed in all the other units of weight or volume, national or foreign, adopted in commerce for the same type of liquid, semi-liquid or semi-solid products. It is furthermore possible to convert immediately monetary values expressed in metrical units (dollars, francs, florins, pesetas, lire, marks, kr., etc.) into values expressed in non-metrical units, such as, for instance, those of the British currency (pound sterling, shillings, pence). All this is done by the instrument itself without having to know the basic conversion factors, and without having to consult any table or chart, with the result that, apart from the advantage of saving a great amount of time, the use of the instrument is accessible even to any person with very limited mathematical experience.

2

The nature and object of this invention will be better understood from the description of a particular illustrative type of the instrument, shown in the accompanying drawing as it is devised to perform the conversions most frequently required in the petroleum products trade (petrol, gasoline, ethers, kerosene, naptha, gas-oil, lubricating oils, industrial oils, greases, bitumens, etc.).

In the drawing:

Fig. 1 shows a plan view of an example of the instrument, with its component parts placed ready for a calculation.

Fig. 2 shows, on a larger scale, the detail of one type of mechanical device mounted on the instrument for the micrometric setting of its movable parts.

Fig. 3 shows a second example of one of the many equivalent or similar mechanical devices which can be replaced for that shown in Fig. 2.

Figure 3, as already mentioned, illustrates another example of the mechanical devices which may be adopted on the instrument in substitution of that shown on Fig. 2. Even here the setting of the two movable scales C and D is obtained by the axial displacement of the nut T along the screw Y operated by hand by means of the knob X, through the rocker arm W, the shorter end of which is held by the rod S connected to the support E mounted on scale D, whereas the other end is connected to the scale C by means of the rod R. In this way a slight displacement of the nut T results in an amplified movement of one of the scales in respect of the other.

In the example of embodiment illustrated in Fig. 1, the instrument is mainly composed of two stationary logarithmic scales A and B rigidly connected one to the other, with in between an interval acting as longitudinal guideway for two slidable scales C and D. The outer graduations of the latter may be brought into alinement with those of the stationary scales, while the inner graduation of each slidable scale may respectively be brought into alinement with a reference line engraved on the opposite slidable scale. The two slidable scales C and D can be set and kept in a proper relative position by a mechanical device of the type shown separately, on a larger scale, in Fig. 2. The rotation by hand of the knob X, and consequently of the micrometric screw Y, causes an axial movement of the nut T which is transmitted to the scale C through the arm W. When the two slidable scales C and D have been adjusted by means of this mechanical device and kept in their relative position required by the problem to be solved, they form a sort of unitary slide which can then be displaced by hand by the operator, along the longitudinal guideway, in order to bring their graduations into substantial alinement with the graduation of the stationary scales A and B.

The stationary scale A contains an increasing graduation numbered from 1 to 100,000, representing quantities by weight, with no reference to any particular unit of measure, while the stationary scale B contains an identical graduation representing quantities by volume, also with no reference to any particular unit of measure. Both graduations, of the stationary scales A and B, are employed also to represent prices, costs, quotations, expenses, etc., with the understanding that, when the readings are made on scale A of weight, such price is in terms of money per unit weight (for example, U. S. cents per lb., U. S. cents per kilogram, U. S. cents per quintal, U. S. cents per short ton, U. S. cents per metric ton, U. S. cents per long ton, etc.); and analogously, when the readings are made on the scale B of volume, such price is in terms of money per unit volume (for example, U. S. cents per U. S. quart, U. S. cents per litre, U. S. cents per imp. quart, U. S. cents per U. S. gallon, U. S. cents per imp. gallon, U. S. cents per barrel, U. S. cents per cubic meter, etc.). Any money or else other currencies may be employed, provided that the same money or currency be considered per all the various units of measure either of weight or of volume in each problem to be solved.

The slidable scale C, on its edge adjacent the stationary scale A, bears two series of properly spaced marks or lines, in two different colors, for instance black and red. Each one of these marks, instead of being numbered, is defined by initials or symbols indicating a particular unit weight it represents. For example, one series of marks colored black, includes one mark representing long tons (LT), another mark representing metric tons (MT), and so on; other marks respectively represent short tons (ST), quintals (100 kg.), kilograms (kg.), pounds avoirdupois (lb.), etc. The other series of marks colored red includes an equal number of marks identically defined as those of the black series, but disposed in a different position and in a reverse succession. The black marks serve for the conversion of quantities by weight, while the red marks serve for the conversion of prices, quotations, expenses, etc., per unit weight. To be better distinguished, the red marks are also countersigned by a small sign (for instance, by a small triangle as in Fig. 1).

In like manner, the slidable scale D, on its edge adjacent the stationary scale B, bears two series of properly spaced marks or lines, in two different colors identical to those of scale C. Each one of these marks is similarly defined by initials or symbols indicating a particular unit volume it represents. One series of black marks includes one mark representing cubic meters (CM), another mark representing barrels (bbl.), and so on, other marks representing cubic feet (CF), imp. gallons (IG), U. S. gallons (g.), litres (lt.), U. S. quarts (qt.), etc. The other series of red marks includes an equal number of marks identically defined as those of the black series, but disposed in a different position and in a reverse succession. The black marks serve for the conversion of quantities by volume, while the red marks serve for the conversion of prices, etc., per unit volume. The red marks are also countersigned by a small triangle, as told for scale C.

A black pointer or arrow F is engraved on scale C, on its edge adjacent the slidable scale D, as a reference line for reading the graduation of the specific gravity engraved in black color on scale D. Next to that, a red pointer or arrow G is engraved on scale D, as a reference line for reading the graduation of the A. P. I. gravity (or Baumé density), engraved in red color on scale C.

Lastly, in the remaining space resulting on the two slidable scales C and D, comprising two rectangular areas U, and V, two different series of graduations are inserted facing one another and respectively located one on the scale D and the other on the scale C. Each one of these graduations is defined and numbered in terms of the monetary system of a particular country. For instance, in the example of embodiment shown in Fig. 1, the graduation on slide C is numbered in terms of British money (pence, shillings, pounds sterling), while that on slide D is numbered in terms of American money (U. S. cents, dollars). Preferably these graduations may be engraved on interchangeable plates, each one bearing graduations numbered in terms of the monetary system of one country, so as to make it possible to couple all the pairs of money systems in which one is more frequently interested.

In the particular example shown by Fig. 1, the graduation of pounds sterling, engraved on area V, is subdivided into lines representing shillings and numbered in terms of shillings; the graduation of shillings is subdivided into lines representing pence, and finally the graduation of pence is subdivided into decimal fractions of a penny. In like manner, the graduation of dollars engraved on area U, is subdivided into lines numbered in terms of cents of dollar, and similarly the graduation of cents is subdivided into lines numbered in terms of decimal fractions of a cent. Due to the fact that the American monetary system is subdivided into decimal and centesimal fractions, the graduations engraved on area U may also be employed, applying the appropriate reductions, to represent occasionally the monetary system of other countries, the money of which is subdivided into decimals (as for instance pesos, contos, francs, florins, crowns, lire, marks, etc.), affording thus the possibility of reducing the set of interchangeable plates to a minimum.

In using the calculating apparatus, when the problem involves conversions of quantities by weight or by volumes, the operator adjusts at first the slidable scales C and D, by means of the micrometric device of the type illustrated in Fig. 1, and in Fig. 2, in order to set the black arrow F opposite the line of the black graduation representing the specific gravity possessed by the liquid or semiliquid for which the conversions are to be made (for instance 0.900). He then moves by hand the whole unit, formed by the two slides, as if it were a single slide, and places the black mark representing the given unit weight (for example ST, say short ton) opposite the value to be converted (for instance 27, thus forming 27 short tons) read on the stationary scale A of weight. He will thereby be able to find immediately and simultaneously the result of all possible conversions sought, by simply reading, on the graduations of scales A and B, the values in alinement with the marks representing the remaining units of measure, either by weight or by volume. For example, given a quantity of 27 short tons of an oil possessing a specific gravity of 0.900, after the setting described above, the operator will be able to read simultaneously, on scales A and B, the following results for the conversions sought: 24.1 long tons, 24.49 metric tons, 27 short tons, 244.9 quintals, 24,490 kilograms, 54,000 lbs., 27 cubic meters, 170 barrels, 954 cubic feet, 5,950 imp. gallons, 7,140 U. S. gallons, 27,000 litres, 28,560 U. S. quarts, etc.

In case the unit to be converted is a unit of volume, the operator places the black arrow representing the given volume unit (for instance, barrel), opposite the value to be converted (for instance 170 thus forming 170 barrels) read on the stationary scale B of volume. He will thereby be able to find immediately and simultaneously the result of all possible conversions sought, by simply reading, on the graduation of scales A and B the values in alinement with the marks representing the other units of measure either by weight or by volume.

When the problem involves conversions of prices, quotations, charges, profits, etc. (generally expressed in terms of money per unit weight or per unit volume), the operator acts in the same way as noted above, for conversion of quantities, with the only difference that he has to do it using the red marks, the red arrow G and the red graduation of the A. P. I. gravity instead of the black ones. For example, given a price of 10 U. S. cents per U. S. gallon, quoted for a gasoline of 57 A. P. I. gravity, and wanting to convert such prices into the equivalent price related to any other unit of measure by weight or by volume, the operator only has to adjust the slidable scales C and D, in order to set the red arrow opposite the value 57 of the red graduation of A. P. I. gravity, and then move the whole unit until he places the red mark G (say U. S. gallon) opposite the value 10 of the scale of volume B. He will thereby read on the graduation of this scale, respectively, opposite each red mark, the following equivalent prices: 2.5¢ per U. S. quart, 2.63¢ per liter, 10¢ per U. S. gallon, 12¢ per imp. gallon, 42.200¢ or $4.20 per barrel, $26.33 per cubic meter. On the scale of weight A the operator will read respectively, opposite each red mark engraved on the slide C, the following equivalent prices: 1.6¢ per lb., 3.5¢ per kilogram, 3.5 $ per quintal, $32 per short ton, $35 per metric ton, $35.60 per long ton, etc.

When the problem consists in converting a given amount of money expressed in terms of one monetary system, into the equivalent amount in terms of another monetary system, (as, for example, from the British into the American system), the operator simply adjusts the two slidable scales C and D in accordance with the selected rate of exchange, and therefore, for example, brings the "one" line of the pound sterling graduation opposite the equivalent dollar value of the graduation of dollars, at the selected rate of exchange, (for example 1£=$4). He may also, if he prefers, bring the "one" line of the dollar graduation opposite the equivalent shilling value of the graduation of shillings (for example $1=5 shillings). He will thereby find immediately the solution sought by simply reading the value, in terms of the other money, that stands opposite the given value. For example, at the above mentioned rate of exchange, and consequent to the alinement of the graduation of the two monetary systems, he will find the following solutions: 1 cent = 0.6 pence, 5¢ = 3 pence, 6 pence = 10¢, 15¢ = 9 pence, 1 shill. = 20¢, 60¢ = 3 shill., 15 shill. = $3, 3£ = $12, $18 = 4 and 10 shill., 1 and 5 shill. = $5, etc. A similar procedure may be followed either in case the dollar scale is employed to represent some other decimal monetary system or in case interchangeable graduations are provided to cover an assortment of money systems.

I claim:

1. A slide rule for the simultaneous conversion of weights, volumes and prices for a plurality of units of measure and exchange as commonly used in the trade dealing with liquid and semi-solid products, comprising a normally stationary basic portion including the spaced-apart longitudinal members disposed to provide a guide-way therebetween and two longitudinal movably disposed bars in said guideway and displaceable one with respect to the other, and means for adjustably linking said two bars to form a unit thereby, a logarithmic scale on each of said spaced-apart members along their edges adjacent to said guideway representing weights and prices per units of weight and volumes and prices per units of volume respectively, a double series of indices corresponding to different units of weight on one of said two movable bars and a double series of indices corresponding to different units of volume on the other one of said two movable bars, said indices being adjacent said two first named logarithmic scales respectively, a logarithmic scale on each of said movable bars adjacent the common edge thereof, respectively corresponding to values of the specific gravity of the liquid product and of the so-called A. P. I. gravity thereof, and an indicator for said gravity scales on the other respective one of said movable bars.

2. A slide rule according to claim 1, further including a logarithmically graduated scale corresponding to the values of a currency of non-decimal subdivision, and another logarithmically graduated scale corresponding to the values of a currency with decimal subdivision respectively on the adjacent faces of said movable bars.

3. A slide rule as claimed in claim 1 wherein said first series of indices respectively on the two movable bars is different both in shape and color from the second series of indices relating to the same unit of weight and volume respectively, the first one of the two series of indices being applicable for the conversion of quantities and the second one of the series of indices being applicable for the conversion of price.

4. A slide rule as claimed in claim 1 wherein said linking means comprises a device with a micrometric screw adapted to establish with precision the relative initial position of said two movable bars and to maintain unchanged such relative position during the simultaneous shifting of the said bars.

PAOLO SBERNADORI.

REFERENCES CITED

The following references are of record in the file of this patent:

UNITED STATES PATENTS

| Number | Name | Date |
|---|---|---|
| 2,156,568 | Lee | May 2, 1939 |

FOREIGN PATENTS

| Number | Country | Date |
|---|---|---|
| 139,340 | Great Britain | Mar. 4, 1920 |
| 232,383 | Great Britain | Apr. 23, 1925 |

OTHER REFERENCES

Cambsoco Scientific Co.'s Catalogue No. 97, of Waverly, Mass., Figures 53-35 on page 226.